(12) United States Patent
Morse et al.

(10) Patent No.: US 6,629,686 B2
(45) Date of Patent: Oct. 7, 2003

(54) PROCESS FOR DISSOLVING GAS INTO A LIQUID

(75) Inventors: Dwain E. Morse, 2655 Montrose Pl., Santa Barbara, CA (US) 93105; Wade O. Morse, Santa Barbara, CA (US); Thomas G. Matherly, Lompoc, CA (US)

(73) Assignees: Dwain E. Morse, Santa Barbara, CA (US); Jerry Friedman, Inglewood, CA (US)

( * ) Notice: Subject to any disclaimer, the term of this patent is extended or adjusted under 35 U.S.C. 154(b) by 0 days.

(21) Appl. No.: 10/271,169

(22) Filed: Oct. 14, 2002

(65) Prior Publication Data

US 2003/0146523 A1 Aug. 7, 2003

Related U.S. Application Data

(63) Continuation-in-part of application No. 10/180,216, filed on Jun. 25, 2002.
(60) Provisional application No. 60/300,768, filed on Jun. 25, 2001.

(51) Int. Cl.$^7$ .................................................. B01F 3/04
(52) U.S. Cl. .................................... 261/79.2; 366/165.1
(58) Field of Search ............................... 261/79.2, 79.1; 366/165.1, 165.4; 210/788, 512.1

(56) References Cited

U.S. PATENT DOCUMENTS

| | | | | |
|---|---|---|---|---|
| 4,834,343 A | * | 5/1989 | Boyes | 261/79.2 |
| 4,880,451 A | * | 11/1989 | Konijn | 261/79.2 |
| 5,405,497 A | * | 4/1995 | Torregrossa | 261/79.2 |
| 5,945,039 A | * | 8/1999 | Kojima | 261/79.2 |
| 6,106,711 A | * | 8/2000 | Morse et al. | 261/79.2 |
| 6,382,601 B1 | * | 5/2002 | Ohnari | 261/79.2 |

* cited by examiner

Primary Examiner—C. Scott Bushey
(74) Attorney, Agent, or Firm—Kelly Bauersfeld Lowry & Kelley, LLP (57) ABSTRACT

A gas is dissolved into a liquid by first pressurizing the liquid to a predetermined level. The pressurized liquid is then directed into a hydrocyclone to form a vortex stream having an evacuated central area. The hydrocyclone has an inlet aperture size and configuration and a barrel diameter and length optimized for liquid particle movement through the liquid vortex stream. Gas is injected into the evacuated area for absorption into the liquid vortex stream. The liquid is then directed from the hydrocyclone into a diffusion column, and subsequently to a pressure chamber in order to collect non-adsorbed gas. The collected non-adsorbed gas is then recycled back into the evacuated area of the vortex stream. Pressurized gas is added to the system as the gas is adsorbed and dissolved into the liquid.

14 Claims, 6 Drawing Sheets

PROCESS FOR DISSOLVING GAS INTO A LIQUID

This application is a continuation-in-part of U.S. application Ser. No. 10/180,216 filed Jun. 25, 2002 which claims priority to U.S. Provisional Application Serial No. 60/300,768, filed Jun. 25, 2001 now expired.

BACKGROUND OF THE INVENTION

The present invention generally relates to the use of dissolved gases within liquids, such as the separation of contaminants from contaminated liquid. More particularly, the present invention resides in a process of introducing a large volume of gas into a given liquid.

The introduction of gas, such as oxygen, into a liquid is necessary for many processes. For example, when removing contaminants from a contaminated liquid source using flotation methods, gas is dissolved or otherwise entrained into the liquid so that flocculation and separation can occur to remove the contaminants. In other processes, a gas, such as $CO_2$, is introduced into the liquid to alter the pH of the liquid. In yet other processes, oxygen is dissolved into the liquid to support biodegradation.

The hydrocyclone has been used as a separator of particles with different specific gravities for years. In an effort to reduce bubble residence time, a variation of the general hydrocyclone, the air-sparged hydrocyclone described in U.S. Pat. No. 4,279,743 utilizes a combination of centrifugal force and air sparging to remove particles from a fluid stream. The stream is fed under pressure into a cylindrical chamber having an inlet configured to direct the fluid stream into a generally spiral path along a porous wall. The angular momentum of the fluid generates a radially directed centrifugal force related to the fluid velocity and the radius of the circular path. The porous wall is contained within a gas plenum having gas pressurized to permeate the porous wall and overcome the opposing centrifugal force acting on the fluid.

In operation, the unit receives and discharges the rapidly circulating solution while the air permeates through the porous wall. Air bubbles that emit from the wall are sheared into the fluid stream by the rapidly moving fluid flow. The invention claims that micro-bubbles formed from the shearing action combine with the particles or gases in the solution and float them toward the center of the cylinder as froth in a vortex. The centrally located froth vortex is then captured and exited through a vortex finder disposed at the upper end of the cylinder while the remaining solution exits the bottom of the cylinder.

One variation in the general ASH construction, as described in U.S. Pat. Nos. 4,838,434 and 4,997,549, includes employing a froth pedestal at the bottom of the cylinder to assist directing the froth vortex through the vortex finder. Another ASH modification includes replacing the vortex finder and froth pedestal with a fixed splitter disposed at the bottom of the cylinder and having a cylindrical knife-edge. The edge is positioned to split the helically flowing solution into components dependent upon the specific gravity of the components.

However, it has been found that traditional hydrocyclones, including air-sparged hydrocyclones, essentially stratify the various components of the contaminated fluid according to specific gravity. The inventors have discovered in working with ASH Systems, that the helically flowing solution only splits into stratified components if the specific gravity is less than 0.5 or greater than 1.7 of the fluids specific gravity, and the particle size is larger than 10 microns. Without these conditions, the liquid cyclone or hydrocyclone becomes a mixer. Properly designed, this mixer can continuously position or "mix" the fluids particles (from water molecules to suspended solids) into the boundary layer or energy interface of the swirling film of liquid and the gas.

Accordingly, there is a continuing need for a process which dissolves a great deal of gas into a target liquid. The present invention fulfills this need and provides other related advantages.

SUMMARY OF THE INVENTION

The present invention resides in a process for dissolving a gas into a liquid. The process of the present invention enables the dissolution of gas into the liquid at greater concentrations and saturations than previous methods with a mechanically simple design which is relatively inexpensive to produce and maintain.

The process of the present invention entails first pressurizing the liquid to a predetermined level. The pressurized liquid is directed into a hydrocyclone to form a vortex stream having an evacuated central area. The hydrocyclone is selected to have an inlet aperture size and configuration corresponding to the liquid pressure, and a barrel diameter and length optimized for liquid particle movement through the liquid vortex stream.

Pressurized gas is then injected into the evacuated area for absorption into the liquid vortex stream. Due to the fact that the hydrocyclone inlet, barrel diameter and barrel length have been optimized for liquid particle movement, a large degree of gas is adsorbed into the liquid.

The liquid is then directed from the hydrocyclone into a diffusion column, where the liquid flows upwardly into a pressure chamber. The pressure chamber includes an upper gas region and a lower liquid region. The non-adsorbed gas is collected in the upper gas region.

The gas within the upper gas region, in a particularly preferred embodiment, is directed from the pressure chamber back into the evacuated area of the vortex stream so as to recycle the non-dissolved gas. The level of the gas within the pressure chamber is sensed, and pressurized gas is added into the pressure chamber when the gas level of the pressure chamber falls below a predetermined level.

The liquid having dissolved gas therein is then passed from the pressure chamber and typically through a cavitation plate. The liquid is then used in the desired process, such as biodegradation, contaminant removal by flocculation and flotation, etc.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

The present invention resides in a process and system capable of delivering a massive concentration of a gas into a liquid. The physical parameters of the system can be configured so as to optimize the levels of gases dissolved within the liquid, and also add no more of the gas than is absolutely necessary so that over-entrainment of the desired gas does not result in post process out-gassing.

Figure 1:
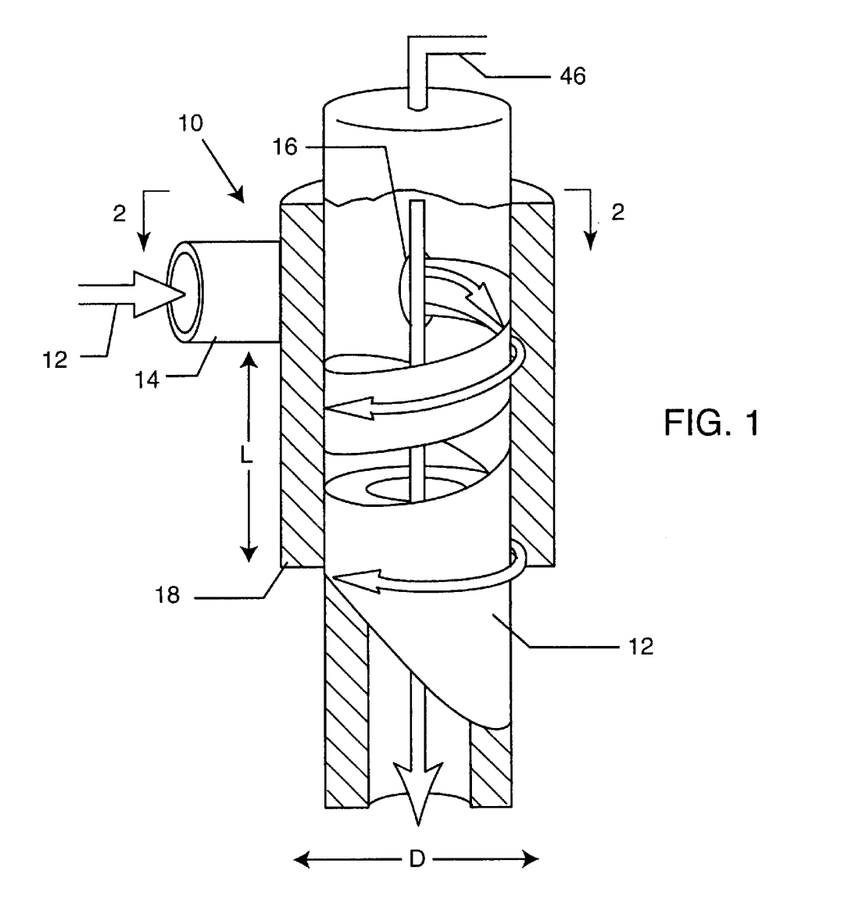
FIG. 1 is a partially sectioned view of a hydrocyclone device forming a liquid vortex system in accordance with the present invention.
Figure 2:
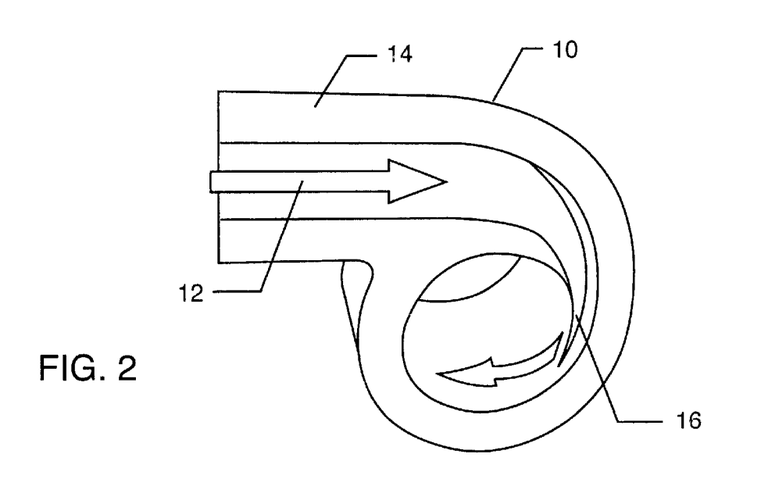
FIG. 2 is a cross-sectional view taken generally along line 2—2 of FIG. 1, illustrating liquid flow through an aperture thereof.

Referring now to FIG. 1, a section of a hydrocyclone 10 is illustrated having a stream of liquid 12 passing therethrough. The hydrocyclone 10 includes a receiving pipe 14 which directs the liquid 12 through an inlet 16 such that the liquid directs the liquid stream 12 into a generally spiral path along an inner surface of a barrel 18 of the hydrocyclone 10. As mentioned above, hydrocyclones, and particularly air-sparged hydrocyclones, have been used in the past in the processes of separating contaminants from a liquid by flocculation and flotation systems. However, as will be more fully described herein, such systems have not optimally introduced an intended gas into the liquid 12 to be treated. The inventors have discovered that by adjusting the pressure of the system, such as by altering the pressure of the incoming liquid 12, the aspect ratio of the inlet 16, and the diameter D and length L of the barrel 18 can significantly increase the amount of gas which is dissolved into the liquid 12.

Figure 3:
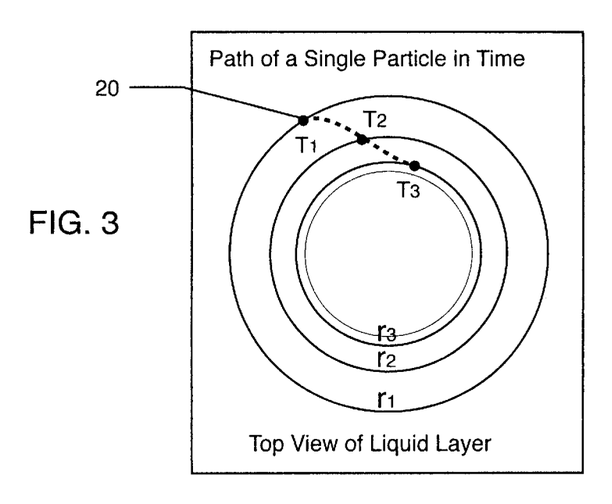
FIG. 3 is a diagrammatic view of a path of a particle of the liquid within the hydrocyclone over time.
Figure 4:
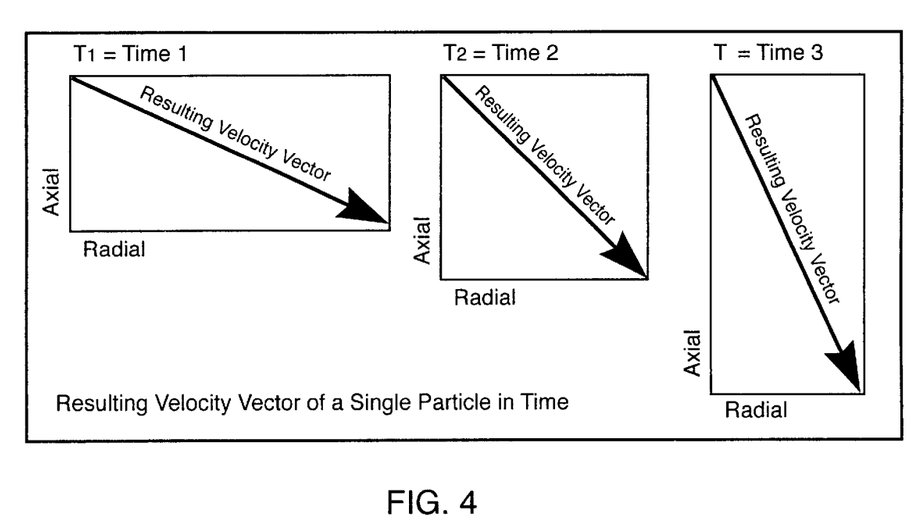
FIG. 4 are diagrammatic representations of resulting velocity vectors of the single particle over the same time period.

With reference now to FIGS. 3 and 4, FIG. 3 illustrates a path of a particle 20 over time in the liquid stream vortex of the hydrocyclone 10 of the present invention. As noted above, during use of previous hydrocyclones, the particles within the liquid stream tended to stratify according to size and specific gravity. It was found that it was particularly difficult to adsorb microbubbles onto particles in the liquid of a particular range, typically less than 50 microns. Thus, these particles were not effectively removed from the contaminated stream. It is believed that this is due to the fact that such particles did not present themselves at a gas/liquid barrier. Hydrocyclones create a spiraling vortex stream having a central evacuated area or portion. Air-sparged hydrocyclones emitted the intended gas through a porous inner surface of the hydrocyclone, where larger particles aggregated and adsorbed onto larger bubbles sheared from the porous tube. In other systems, gas was introduced into the evacuated portion, where very small particles adsorbed the gas. However, only the very large or very small particles tended to adsorb the dissolved gas. Thus, it is a primary objective of the present invention to cause the particles in the liquid stream 12 to migrate and move throughout the stream 12 as it travels through the hydrocyclone 10 so that each particle, or as many particles as possible, are presented at the liquid/gas boundary (R3) to optimize adsorption. Another objective of the present invention is to provide the device that enables control of pressure at the liquid/gas interface boundary (R3).

A particle in accordance with the definitions of the present application is an individual mechanical component of a liquid solution. Particles possess dimension and mobility. Under the effective directional force, a particle will typically travel as one entity. Force may cause the subdivision of a particle into two or more smaller particles. A larger particle may grow from a combination of smaller particles. A particle may be a molecule of a substance, or a group of molecules of a substance or substances. The substance or substances may comprise a solid, liquid, or gas, or a combination thereof. A particle may be spherical, or may be complex or asymmetrical in form. A particle is an instantaneous entity, that is, the particle character may change in time as a result of external influences. Thus, segments of the water or liquid itself may form aggregate groups defining a particle in accordance with the present invention, and not necessarily only those contaminants within the liquid 12.

With continuing reference to FIGS. 3 and 4, directional forces act upon a particle 20 in the liquid 12 and are of two origins. The first force is a centrifugal force resulting from angular momentum of liquid constituent of particles contained cylindrically and thus forced into rotational flow by virtue of the entering liquids tangential velocity. This provides a radial force Vr to individual liquid particles. The second force is an axial force Va caused by the displacement of liquid particles away from the tangential inlet 16, along the axial dimension, or length, of the liquid conduit barrel 18 formed by the hydrocyclone 10.

In FIGS. 3 and 4, a single liquid particle 20 is shown in sequential positions within the hydrocyclone 10, each position being separated from the next by the passage of time, and thus placed in a different radial position within the spiraling liquid stream 12. FIG. 4 charts the resulting velocity vector, denoted by an arrow, of the single particle 20 over the three time periods. When the particle 20 is adjacent to the solid inner-surface of the hydrocyclone 10 (R1), its resulting velocity vector is mainly radial. However, as the particle 20 moves towards the central evacuated portion (R3), the resulting velocity vector is predominantly axial, or extending downwardly into the barrel 18. The single particle 20 is defined in the illustrations in three discrete locations at three sequential times, however, it is to be understood that time is a continuum, and thus radial and axial velocity of the particle are in a continuous flux.

By optimizing the physical parameters of the system of the present invention, the liquid particles, although having a constant mass, can have a constantly changing angular momentum and thus be in continual directional flux. The liquid particle environment in the hydrocyclone 10 of the present invention comprises countless "liquid particles" of varying mass, size, shape and inter-particle attractive and repulsive forces, which further enhance desirable "non-ballistic" translation of liquid particles. Collisions between particles, shear forces between particles induced to rotate due to asymmetrical centers of mass, and elastic behavior of dissolved or entrained gas particles are a few examples of the complexity of possible mixing modes in accordance with the present invention. The described motion of particle flux inside the liquid 12 layer in the hydrocyclone 10 extends to a boundary layer at the liquid solid interface (R1), and the liquid gas interface (R3), such that additive particles, such as gas, may be effectively introduced into the liquid 12 interface and mixed under pressure with desirable results. Thus, gas may be desirably entrained into the gas/liquid particle interface at higher levels, using lower operating pressures, and requiring less contact time, than is possible with prior art devices.

The ability to quickly and efficiently entrain various gases and liquids is the cornerstone of the present invention. Whether the entrainment is achieved in order to promote bio-activity in a sequential batch reactor, to react with hydrogen sulfide gas in a septic body of water, or to displace free oxygen from water by over-pressurizing with a noble gas like argon, the basic mechanism that is controlled in all of the processes is the ability to position a gas into a body of liquid in the exact amount that is required for the next process to be effective.

Figure 5:
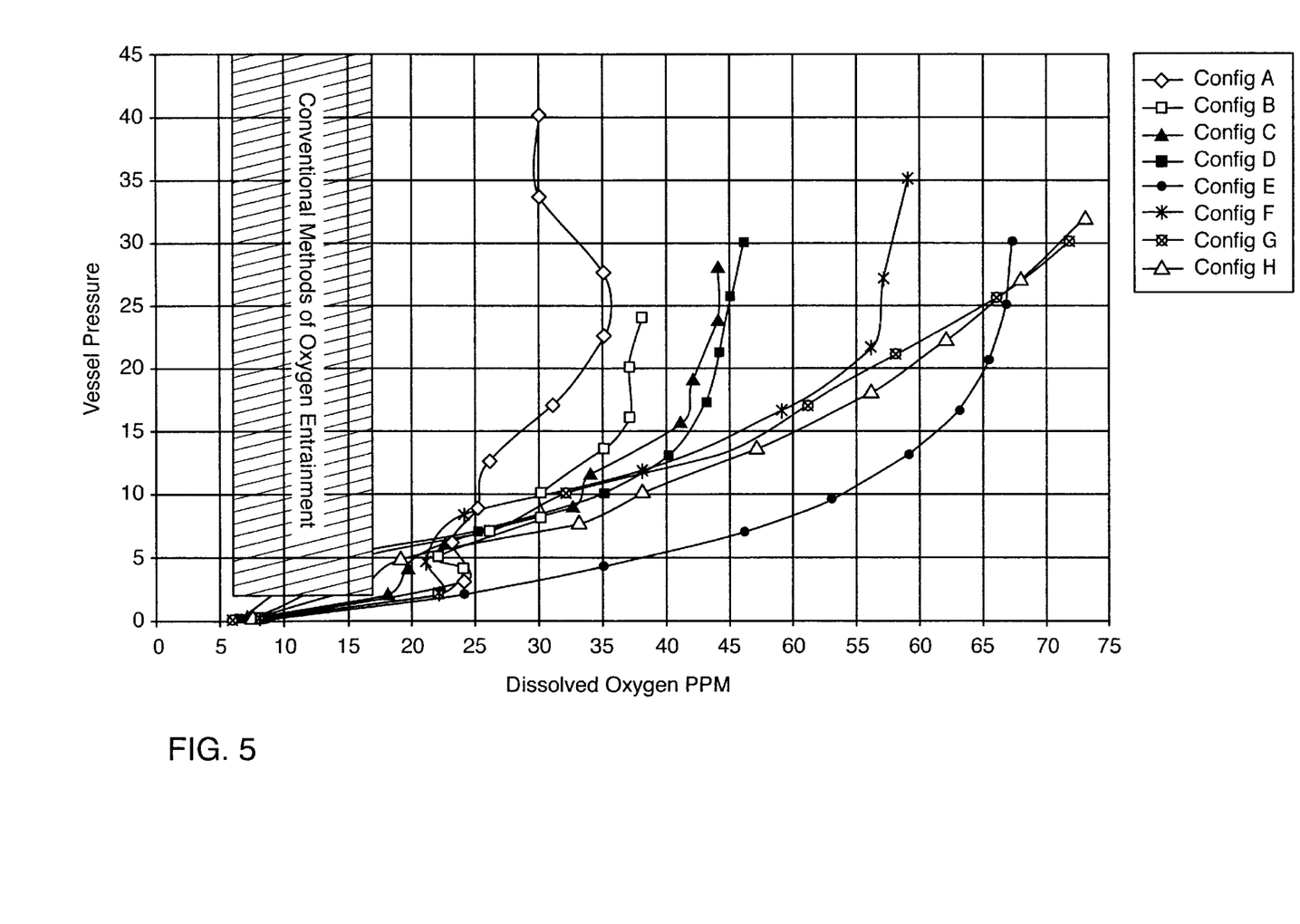
FIG. 5 is a chart illustrating levels of oxygen dissolved in a liquid using various hydrocyclone inlet configurations in accordance with the present invention as compared to conventional methods.

The chart of FIG. 5 documents this ability. Using a dissolved oxygen probe to measure the amount of oxygen that is entrained into standard tap water after passing through the hydrocyclone 10, the effectiveness of the process has been documented. Measurements were made after returning the liquid 12 to normal atmospheric pressure at sea level. All data is predicated on a one time exposure to forces inside the hydrocyclone 10. After one treatment the water was deposited down the drain. The probe used had an upper detection limit of 67 PPM dissolved oxygen. Although there is no indication that the effect would terminate abruptly at 67 PPM, to be conservative in the claims of entrainment, higher entrainment levels were approximated on the trend line only up to the very next achievable pressure setting on the pump for the liquid 12.

The chart illustrates the various levels of entrainment that were obtained using eight different hydrocyclone reactor heads, having different hydrocyclone inlet 16 aspect ratios. When the pressure of the water of the hydrocyclone 10 was increased through the use of a varidrive on a centrifugal pump, the entrainment levels of the dissolved oxygen in the water were measured as was indicated in FIG. 5.

With reference now to FIG. 5, a graph is shown depicting the typical dissolved oxygen parts per million (PPM) of prior art devices between a range of 6 and 17 parts per million, regardless of the hydrocyclone 10 pressure. Configurations A-H of the hydrocyclone inlet 16, also referred to herein as the inlet aspect ratio, are charted showing the dissolved oxygen PPM per vessel pressure. Configuration A was a 24-to-1 rectangular inlet aperture 16. Configuration B was a 10-to-1 rectangular configuration, configuration C being a 6-to-1 rectangular configuration, and configuration D being a 2.6-to-1 rectangular configuration. It will be seen that these configurations, while providing increased dissolved oxygen parts per million in comparison to the prior art, are not optimal configurations for the dissolution of oxygen into the water liquid. Configuration E was nearly square at an aspect ratio of 1-to-1.1, and provided a relatively high dissolved oxygen level at fairly low pressures. Configuration F, which was a circular hydrocyclone inlet 16 also provided satisfactory results, but at a higher liquid pressure. Configuration G, four small circular holes, and configuration H, a series of 32 apertures or "a shower head" configuration also performed generally adequately, but required elevated liquid pressures. Thus, it can be seen that the alteration and selection of the hydrocyclone inlet 16 size and configuration, referred to herein as aspect ratio, can dramatically effect the amount of dissolved oxygen entrained or otherwise introduced into the liquid 12.

Thus, while many inlet aperture 16 profiles are available for use, some being octagonal, some being square, some being rectangular, it has been found that a square 1:10 profile or aspect ratio provides the greatest dissolving of gas given the pressure within the hydrocyclone 10. It has been found that in the 1-to-5 gallon per minute flow range, the width of the aperture should optimally be 0.3125×0.3125 inches. In the 10-to-40 gallon per minute flow range of the liquid 12, the width and length of the aperture 16 should be approximately 0.6125 inches in diameter. Such apertures are sufficiently large that they do not make gas bubbles, which would be wasteful, but rather match the thickness of the liquid 12 layer in the barrel 18 down to a portion of the hydrocyclone 10 once the flow anomalies introduced have decayed and the liquid 12 is blended into a uniform thickness. However, as the aperture size of the inlet 16 is smaller than the pipe 14 that feeds the hydrocyclone 10, the speed at which the liquid travels through the aperture 16 increases. Once this conversion of pressure energy into velocity energy occurs, there is an accompanying drop in liquid pressure after the liquid has traveled through the aperture 16. Typically, 2-to-20 psi is normally converted from the pumping pressure into velocity. Converting less than 2 psi of pressure into velocity usually results in the formation of less than ideal quantities of entrained gas, while converting more than 20 psi of pressure into velocity usually results in the imparting of more gas than is required.

The diameter "D" of the barrel 18 of the hydrocyclone 10 also plays an important role in maintaining a proper environment. At a given flow/velocity from the aperture 16, a larger diameter down tube or barrel 18 results in less angular velocity. Smaller diameter barrels 18 result in increased angular velocity. These radial velocities cause greater or lesser mixing energy and must be considered when making a determination of the barrel 18 diameter. Another crucial component involved in the determination of down tube diameter is the thickness of the water ribbon that is formed in the barrel 18. Thicker ribbons of liquid result as the diameter of the barrel 18 decreases. Thus, it is more difficult to get each particle 20 to the center gas column for exposure to the gases when a thicker water ribbon is used. Preferably, a larger diameter barrel 18 is used, for example, a 5 gallon per minute stream would use a 2 inch diameter barrel 18.

The length "L" of the barrel 18 is another physical parameter that can be altered in order to optimize the gas entrainment into the liquid 12. The longer the water is in the hydrocyclone 10 environment, the higher the probability that every single particle in the liquid 12 has been positioned at the gas/liquid boundary layer and given the opportunity to adsorb as much gas as possible. A general starting point for determining the length of the barrel 18 is approximately 15 times the barrel diameter D, but preferably less than 30 times the barrel diameter D. Frictional drag eventually overcomes the radial forces that spin the liquid 12 around the inner surface of the barrel 18, and convert the flow of the liquid 12 from a radial to a predominantly axial direction. At this point, the continuation of the barrel 18 serves no purpose. However, it has been found that the maximum gas entrainment is reached long before the frictional forces typically convert radial spin entirely into axial flow.

Figure 6:
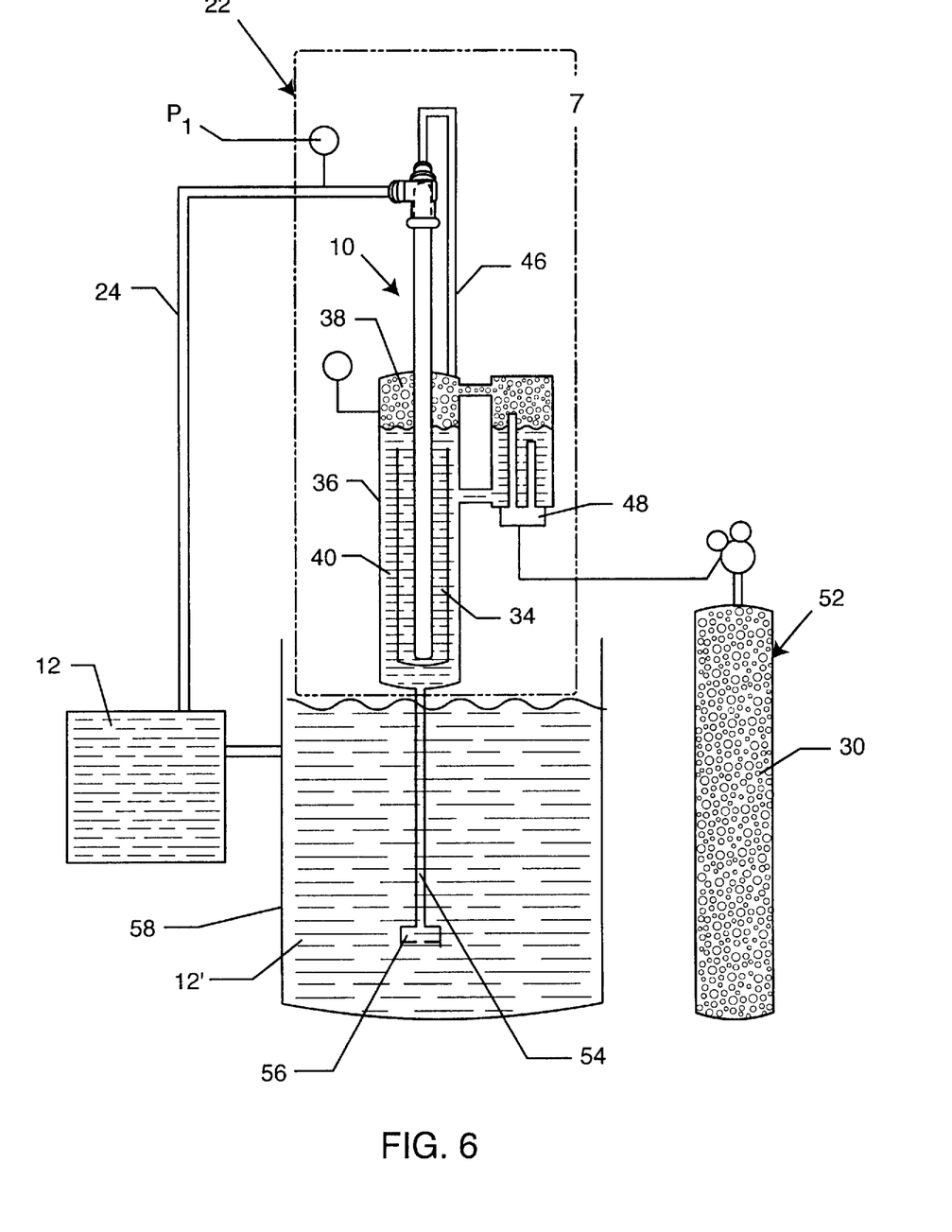
FIG. 6 is a diagrammatic view of a system for dissolving gas into a liquid.

With reference now to FIG. 6, a hydrocyclone 10 having an inlet 16 and barrel 18 optimized to entrain and dissolve gas into the liquid 12 is incorporated into a system 22 of the present invention. The liquid 12 to be treated is pumped through a pipe 24 so as to be at a first pressure P1, and into the hydrocyclone 10.

Figure 7:
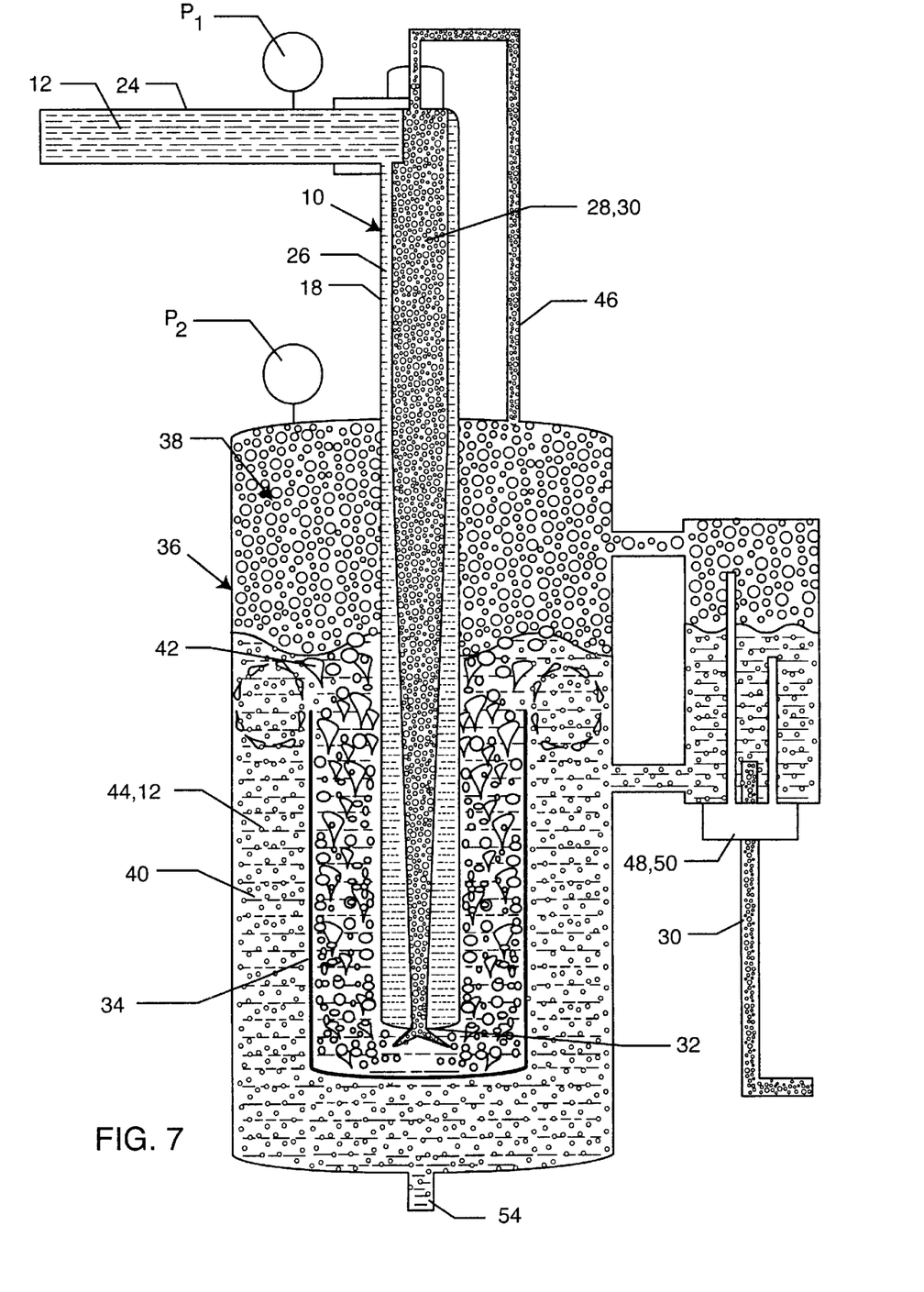
FIG. 7 is an enlarged sectional view of area "7" of FIG. 6, illustrating liquid passing through a hydrocyclone, a diffusion column and a pressure chamber of the present invention.

As shown in FIG. 7, after entering the hydrocyclone 10, the liquid 12 forms a vortex stream 26 having an evacuated central area or portion 28, which form a generally V sectional area, as illustrated. The gas 30 which is intended to be dissolved or otherwise entrained into the liquid is pumped into the hydrocyclone so that the gas 30 fills the evacuated portion 28. As described above, as the liquid 12 spirals through the barrel 18 of the hydrocyclone 10, its individual particles are continuously moved so that they contact the liquid/gas interface. This enables the particles to adsorb as much gas as possible. This is due to the selection of the physical parameters of the hydrocyclone 10 for the given liquid pressure P1 and gas pressure P2.

The liquid 12 and gas 30 exit the hydrocyclone 10 at its outlet 32. A wall 34 is positioned below the outlet 32 of the hydrocyclone 10 and is directed upward so as to create a diffusion chamber. The diffusion chamber 34 converts the radial spin of energized liquid from the hydrocyclone 10 into laminar axial flow. This is accomplished with frictional losses. As the water spins, it encounters the solid surface of the exterior of the barrel 18, and the walls 34 of the diffusion chamber, which slows down the radial component of the liquid velocity. The change of direction from the outlet 32 of the hydrocyclone 10 to the diffusion chamber 34 creates additional friction, thus removing even more of the radial energy component. The diffusion chamber 34 has a greater diameter than the barrel 18 of the hydrocyclone 10 so as to diffuse the movement of the liquid 12.

With continuing reference to FIG. 7, the diffusion chamber 34 is disposed within a pressure chamber 36. The pressure chamber 36 includes an upper gas region 38 and a lower liquid region 40. As illustrated, the diffusion chamber 34 is disposed within the liquid region 40 such that the exiting liquid 12/gas 30 is directed towards the gas 38/liquid 40 boundary so that large bubbles of undissolved gas 42 coalesce and rise into the gas region 38, whereas the dissolved and micro-size gas bubbles 44 are retained in the liquid and flow into the liquid region 40. Thus, a relatively homogenous mixture of gas bubbles 44 and liquid 12 is achieved. The pressure chamber 36 contains the gas 30 and liquid 12 under system pressure and converts the direction of the liquid 12 one more time, effectively dampening any left over radial momentum in the liquid 12. The radial flow is now converted entirely into laminar axial flow.

The laminar flow enables large gas bubbles 42 that get trapped in the liquid 12 to flow back up into the gas collection chamber region 38 so that the gas 30 can be reused. This is accomplished by having a gas recycle pipe 46 extending from the pressure chamber 36 to the hydrocyclone 10 so that gas is not unnecessarily wasted, but can be dissolved into the liquid 12 and recycled.

The gas 30 within the gas region 38 is preferably kept at a certain level or pressure, P2. However, it will be appreciated that the recycling of the gas through tube 46 will cause the gas level in the gas region 38 to be depleted over time. Thus, a sensor 48 is utilized to maintain the desired level within the pressure chamber 36, and thus the levels of the gas within the gas region 38, and the liquid within the liquid region 40. As the gas 30 is depleted, the sensor detects the low level of gas in the gas region 38, or the high level of liquid 12 in the liquid region 40, and electronic controls 48 thereof cause pressurized gas 30 from a gas source such as a pressurized gas tank 52 to be released or otherwise pumped into the pressure chamber 36 to maintain the proper level in the tank.

Thus, as the liquid 12 passes into the hydrocyclone 10 and accelerates down the barrel 18, the rapidly moving liquid 12 interacts with the gas column 30 that exists in the center of the barrel 18 and pulls gas down the barrel 18. If the gas is not replaced, a vacuum forms at the top of the hydrocyclone 10, which has been measured at between 2 and 29.5 inches of vacuum (Hg), depending upon the configuration of the hydrocyclone 10. The recycle tube 46 allows undissolved gas to be recycled, and newly entered gas 30 to be introduced in the evacuated space so that the proper ingestion is maintained. Thus, large excess gas and bubbles are continually recycled back through the gas ingestion mechanism so that only gases that are dissolved and gases that are so small as to be nearly dissolved, are entrained in the liquid 12 and exit through the system.

The liquid 12' having the desired level of gas dissolved therein is then released through a pressure chamber outlet 54 and typically through a cavitation plate 56 which effectively pressurizes the system 22 so that the gas 30 can be entrained in the liquid 12 at the appropriate levels. Cavitation plates 56 are well-known in the art for such purpose. The dissolved gas liquid 12' is then held in a storage tank 58, or passed along to the next process in the system.

Figure 8:
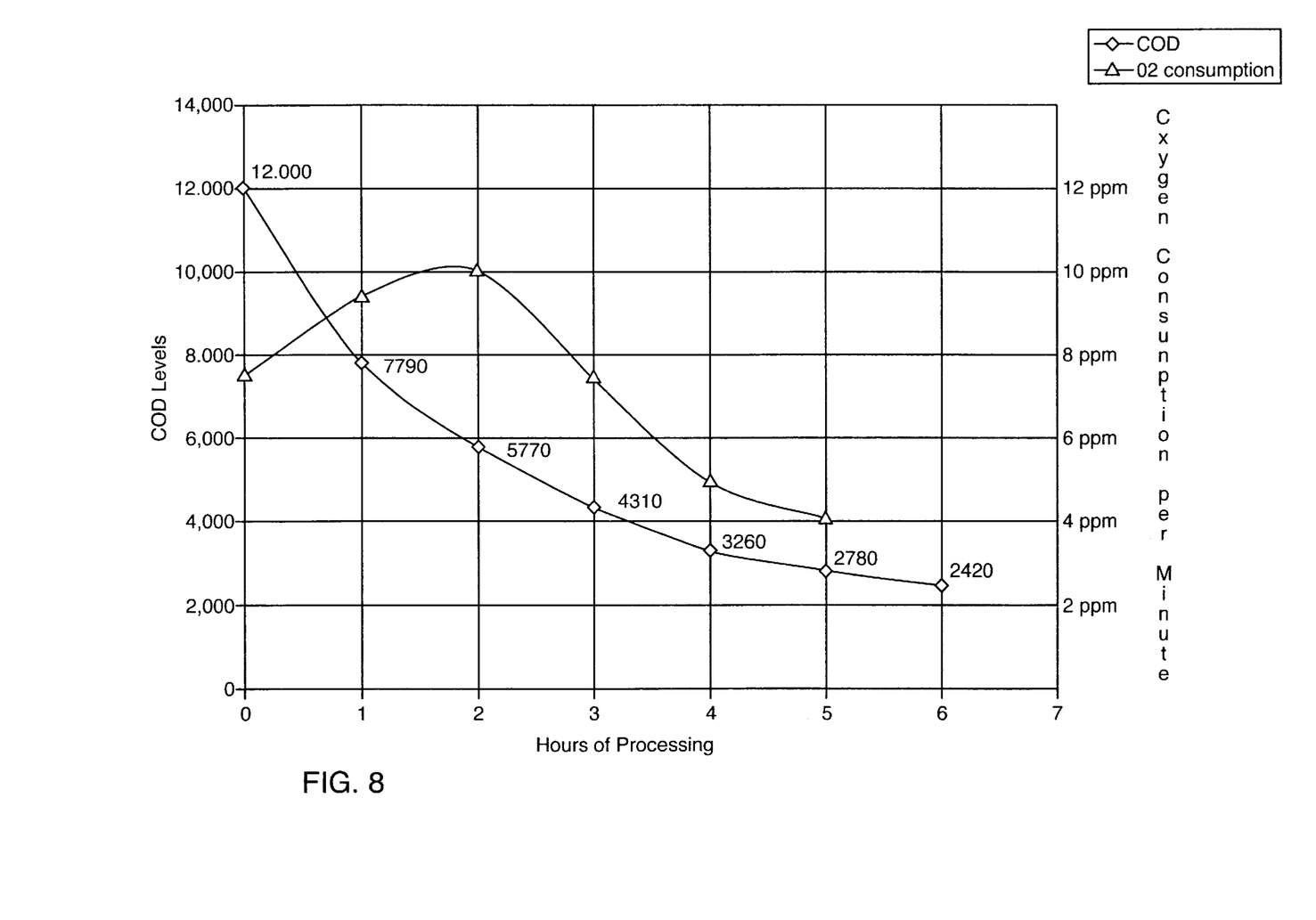
FIG. 8 is a chart illustrating oxygen consumption by bacteria in a milk test conducted using the process of the present invention.

With reference now to FIG. 8, an exemplary use of liquid 12' having dissolved oxygen therein at relatively high concentrations in accordance with the process of the present invention is illustrated. A bio-tank oxygen replacement system was set up in order to test the ability of the present invention to dissolve pure oxygen into contaminated water and render this dissolved oxygen available in a life sustaining capacity to a fully mature and highly active biological colony of microscopic organisms. These organisms were added to a milk and tap water solution in order to convert the dissolved solids present in the milk into carbon dioxide gas and suspended solids, which are more easily removed from the fluid. The control of dissolved oxygen levels is necessary to promote the activity of the biological species as they are the instrument through which dissolved contaminants may be more easily separated from the water. These bacteria organisms consume dissolved oxygen from the water as they perform their normal bodily functions. When the bacteria are used to convert contaminants in water from dissolved to suspended solids, tremendous quantities of these agents are necessary to make the conversion take place in an expedient time frame. Thus, tremendous amounts of oxygen must be replaced in order to promote the conversion.

The rate of oxygen consumption in this process is not fixed due to the complex variety of biological species and the bio-products that each species produces. At the beginning of the process, oxygen consumption rates are relatively slow. Once a particular biological species consumes the dissolved contaminants in the water, they divide and increase the general population of that particular species by a factor of 2. These offspring consume more of the dissolved contaminants and repeat the process. As the population of the species grows, the oxygen depletion rate increases until either the contaminant level is depleted or the available dissolved oxygen level is depleted. In either case, the population of the species will begin to dwindle.

The test system was configured to hold 60 gallons of the water/milk mixture. This mixture was continually pumped through the aeration system 22 described above, 24 hours per day. Fresh milk, potassium, ammonia and a new batch of bacteria were added periodically. The gross dissolved oxygen (DO) content of the water/milk mixture in the tank was checked constantly and the flow was adjusted to maintain the dissolved oxygen content of the mixture between 3 parts per million and 15 parts per million. The oxygen consumption rate was checked periodically as well as the temperature and pH.

A settling rate of the mixture test was performed periodically to understand the maturity of the consumption process and to determine when to provide another dose of fresh milk to keep the bacteria population at a healthy rate. Samples were examined under a microscope each day to catalog the species development and population density. After seven days of incubation, it is determined that the culture was mature enough to undergo a major spike in activity. The periodic additions of fresh milk, potassium, and ammonia were increased from a 1300 PPM to a 2600 PPM dose. When the culture responded positively, the dose was increased to 5200 PPM. The dose was eventually increased to 10,400 PPM.

The chart illustrated in FIG. 8 documents the activity level in the tank when 10,400 PPM of the milk, ammonia and potassium mixture was added. The reduction in COD levels document the cultures ability to convert dissolved solids into $CO_2$ gas. This level of activity was quite startling. The ability to precisely administer very small amounts of pure oxygen into the water/milk mixture and maintain acceptable levels of dissolved oxygen so that the culture could adsorb at this very high bio-activity level has previously been unheard of. The bacteria species consumed approximately 10,000 COD in six hours.

The system 22 of the present invention can be fluctuated in order to alter the dissolved oxygen demand by means of a dissolved oxygen probe placed in the biological processing liquid, and a servo system that receives a signal from the dissolved oxygen probe and then send a control signal to the gas replacement system. Pumps can be sped up or slowed down, or activated or disabled in order to drive the gas replenishment system. The pressure of the gas within the pressure chamber 36 gas region 38 could be altered, or the purity of the oxygen altered to meet the demand of the biological species.

Subsequent tests were performed on the water/milk mixture in order to determine the chemistry required to remove the remaining COD present in the mixture after the biological agents had consumed what was physically available to them. After a one hour decanting, in which the remaining solids were allowed to settle out of solution, only 40 PPM of cationic polymer was required to decrease the COD level to 310 COD, showing that the bio-culture was able to convert the dissolved solids into food which was then converted into either carbon dioxide gas or settleable solids, which were converted by other biological species into settleable solids or more carbon dioxide gas. What was left was removable by chemical means at very economical dosages.

The process of the present invention can be used in other mechanisms as well. For example, in order to destroy biological contaminants, ozone may be entrained into the liquid 12 at very high levels. In yet other applications, carbon dioxide may be entrained into the liquid in order to alter the pH of the liquid.

The selection of the physical parameters of the hydrocyclone 10, as well as the utilization of the diffusion chamber 34, pressure chamber 36 and accompanying pressures, as well as the recycling of the gas 30 creates a very economic and efficient system which is capable of entraining a higher level of gas 30 into a liquid 12 than conventional devices and methods.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. A process for dissolving a gas into a liquid, comprising the steps of:

pressurizing the liquid to a predetermined level;

directing the pressurized liquid into a hydrocyclone to form a vortex stream having an evacuated central area;

injecting the gas into the evacuated area for adsorption into the liquid;

directing the liquid from the hydrocyclone and into a diffusion column;

directing the liquid from the diffusion column into a pressure chamber having an upper gas region and a lower liquid region to collect non-adsorbed gas; and directing the gas within the upper gas region of the pressure chamber back into the evacuated area of the vortex stream.

2. The process of claim 1, including the step of selecting a hydrocyclone having an inlet aperture size and configuration optimized for liquid particle movement through the liquid stream.

3. The process of claim 2, wherein the selecting step comprises selecting a hydrocyclone inlet having a size and configuration corresponding to the liquid pressure.

4. The process of claim 1, including the step of selecting a hydrocyclone barrel diameter and length optimized for liquid particle movement through the liquid stream.

5. The process of claim 1, including the step of sensing the level of gas within the pressure chamber.

6. The process of claim 5, including the step of adding pressurized gas into the pressure chamber when the gas level of the pressure chamber falls below a predetermined level.

7. The process of claim 1, including the step of passing liquid having dissolved gas therein from the pressure chamber and through a cavitation plate.

8. A process for dissolving a gas into a liquid, comprising the steps of:

pressurizing the liquid to a predetermined level;

selecting a hydrocyclone having an inlet aperture size and configuration and a barrel diameter and length optimized for liquid particle movement through a liquid vortex stream thereof;

directing the pressurized liquid into the hydrocyclone to form a vortex stream having an evacuated central area;

injecting the gas into the evacuated area for adsorption into the liquid;

directing the liquid from the hydrocyclone and into a diffusion column;

directing the liquid from the diffusion column into a pressure chamber having an upper gas region and a lower liquid region to collect non-adsorbed gas; and directing the gas within the upper gas region of the pressure chamber back into the evacuated area of the vortex stream.

9. The process of claim 8, wherein the selecting step comprises selecting a hydrocyclone inlet having a size and configuration corresponding to the liquid pressure.

10. The process of claim 8, including the step of sensing the level of gas within the pressure chamber.

11. The process of claim 10, including the step of adding pressurized gas into the pressure chamber when the gas level of the pressure chamber falls below a predetermined level.

12. The process of claim 8, including the step of passing liquid having dissolved gas therein from the pressure chamber and through a cavitation plate.

13. A process for dissolving a gas into a liquid, comprising the steps of:

pressurizing the liquid to a predetermined level;

selecting a hydrocyclone having an inlet aperture size and configuration corresponding to the liquid pressure and a barrel diameter and length optimized for liquid particle movement through a liquid vortex stream thereof;

directing the pressurized liquid into the hydrocyclone to form a vortex stream having an evacuated central area;

injecting the gas into the evacuated area for adsorption into the liquid;

directing the liquid from the hydrocyclone and into a diffusion column;

directing the liquid from the diffusion column into a pressure chamber having an upper gas region and a lower liquid region to collect non-adsorbed gas;

directing the gas within the upper gas region of the pressure chamber back into the evacuated area of the vortex stream; and sensing the level of gas within the pressure chamber, and adding pressurized gas into the pressure chamber when the gas level of the pressure chamber falls below a predetermined level.

14. The process of claim 13, including the step of passing liquid having dissolved gas therein from the pressure chamber and through a cavitation plate.

* * * * *